United States Patent
Pawlak

(10) Patent No.: US 9,636,889 B2
(45) Date of Patent: May 2, 2017

(54) COMPOSITE FORMED BOARD

(71) Applicant: AP PLAST SP. Z.O.O., Poznań (PL)

(72) Inventor: Andrzej Pawlak, Środa Wlkp. (PL)

(73) Assignee: AP PLAST SP. Z.O.O., Poznan (PL)

(*) Notice: Subject to any disclaimer, the term of this patent is extended or adjusted under 35 U.S.C. 154(b) by 0 days.

(21) Appl. No.: 14/891,279

(22) PCT Filed: May 13, 2014

(86) PCT No.: PCT/PL2014/000051
§ 371 (c)(1),
(2) Date: Nov. 13, 2015

(87) PCT Pub. No.: WO2014/185795
PCT Pub. Date: Nov. 20, 2014

(65) Prior Publication Data
US 2016/0067942 A1    Mar. 10, 2016

(30) Foreign Application Priority Data
May 15, 2013  (PL) ......................................... 403889

(51) Int. Cl.
*B32B 3/30* (2006.01)
*B32B 5/18* (2006.01)
(Continued)

(52) U.S. Cl.
CPC ................. *B32B 3/30* (2013.01); *B32B 1/08* (2013.01); *B32B 5/18* (2013.01); *B32B 5/24* (2013.01);
(Continued)

(58) Field of Classification Search
CPC .... B32B 3/30; B32B 5/18; B32B 5/24; B32B 9/046; B32B 21/04; B32B 21/047;
(Continued)

(56) References Cited

U.S. PATENT DOCUMENTS

2003/0082365 A1    5/2003   Geary et al.

FOREIGN PATENT DOCUMENTS

| CN | 101 367 287 A | 2/2009 |
| CN | 102 336 039 A | 2/2012 |

(Continued)

OTHER PUBLICATIONS

Andrew Hammond, ISA/EP, International Search Report mailed Sep. 3, 2014 in International Patent Application No. PCT/PL2014/000051, 4 pages.

*Primary Examiner* — Catherine A Simone
(74) *Attorney, Agent, or Firm* — Masuvalley & Partners

(57) ABSTRACT

Composite formed boards made of plastic and organic material with a fibrous structure are described. The composite is a foamed mix having a density lower by at least 10% and preferably 20%, than the density of a solid organic-plastic composite made of the same components. The foamed mix is bonded permanently and inseparably with a solid plastic layer, at least from a side opposite to a homogeneous rubber-polyurethane composite. The thickness of the solid plastic layer is smaller than that of the organic-plastic layer (preferably at least five times and most preferably at least fifteen times) and that of the rubber-polyurethane layer (preferably at least fifteen times and most preferably at least twenty-five times). The solid plastic layer may have a grooved structure or an impressed structure with a concavity directed inwardly. The solid plastic layer is preferably bonded with the organic-plastic layer by a co-extrusion joint.

19 Claims, 1 Drawing Sheet

(51) Int. Cl.

| | |
|---|---|
| *B32B 25/04* | (2006.01) |
| *B32B 27/06* | (2006.01) |
| *B32B 27/12* | (2006.01) |
| *B32B 27/40* | (2006.01) |
| *B32B 5/24* | (2006.01) |
| *B32B 7/12* | (2006.01) |
| *B32B 9/04* | (2006.01) |
| *B32B 21/04* | (2006.01) |
| *B32B 25/08* | (2006.01) |
| *B32B 27/30* | (2006.01) |
| *B32B 27/32* | (2006.01) |
| *B32B 1/08* | (2006.01) |
| *E04F 15/10* | (2006.01) |

(52) U.S. Cl.
CPC ............... *B32B 7/12* (2013.01); *B32B 9/046* (2013.01); *B32B 21/04* (2013.01); *B32B 21/047* (2013.01); *B32B 25/04* (2013.01); *B32B 25/045* (2013.01); *B32B 25/08* (2013.01); *B32B 27/06* (2013.01); *B32B 27/065* (2013.01); *B32B 27/12* (2013.01); *B32B 27/30* (2013.01); *B32B 27/302* (2013.01); *B32B 27/304* (2013.01); *B32B 27/308* (2013.01); *B32B 27/32* (2013.01); *B32B 27/40* (2013.01); *B32B 2419/00* (2013.01); *E04F 15/102* (2013.01); *E04F 15/105* (2013.01); *E04F 15/107* (2013.01); *E04F 2203/08* (2013.01)

(58) Field of Classification Search
CPC ....... B32B 25/04; B32B 25/045; B32B 25/08; B32B 27/12; B32B 27/40; B32B 27/06; E04C 5/00; E04B 1/41; E04F 15/102; E04F 15/02044; E04F 15/105; E04F 15/107; E04F 2201/0529; E04F 2201/0588; E04F 2201/0582; E04F 2201/0583; E04F 13/0841; E04F 13/0846; E04F 13/144; E04F 19/06; E04F 13/0835; E04F 13/142
USPC .......................... 52/698, 699, 700, 704, 705
See application file for complete search history.

(56) References Cited

FOREIGN PATENT DOCUMENTS

| | | |
|---|---|---|
| CN | 202 194 261 U | 4/2012 |
| CN | 202 242 184 U | 5/2012 |
| CN | 202 271 607 U | 6/2012 |
| CN | 203 429 812 U | 2/2014 |
| FR | 2 765 305 A1 | 12/1998 |

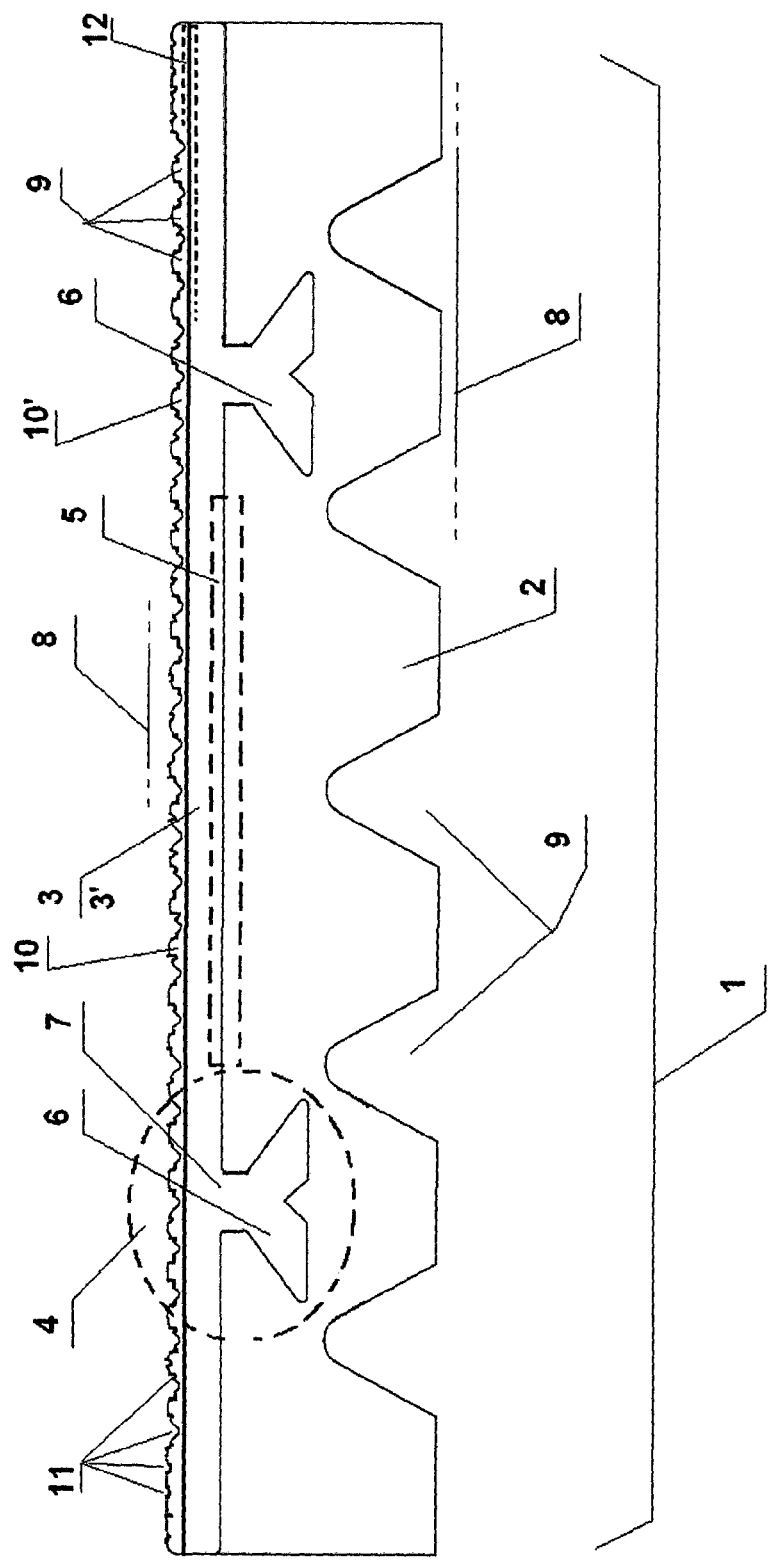

COMPOSITE FORMED BOARD

This application is the U.S. National Phase of International Application No. PCT/PL2014/000051 filed on May 13, 2014, entitled "Composite Formed Board," and claims priority to Polish Patent Application No. 403889, filed on May 15, 2013, which are hereby expressly incorporated by reference in their entirety for all purposes.

TECHNICAL FIELD

The present invention relates to composite formed boards used as a construction element for pavements, platforms, terraces, floors, walkways, and more particularly intended to be used in the open air, outside buildings.

BACKGROUND OF THE DISCLOSURE

Construction elements made of composite materials are commonly known. Particular implementations containing plastics and organic material with a fibrous structure, which form a plastic-organic composite when combined, are also known. The plastic-organic composite has particular properties which allow for using it as a building material for construction elements, particularly those exposed to variable atmospheric conditions. Because of the method of its production, this material enables to create construction elements with rather small thickness while maintaining their hardness. Unfortunately, the increased hardness leads to an inconvenience consists in increasing the brittleness of these elements, and it is also unfavourable considering the application of these construction elements, namely using them as a pavement. That is why other elements corresponding to them are used, for improving the convenience of using the pavement by application of elastic foundations.

The other mentioned inconvenience is eliminated by obtaining a special construction, which increases the strength of a hard but brittle element. It is possible to obtain special structures thanks to a conventional method for production of plastic-organic construction elements, namely by extruding them in the form of connectable profiles, optimally closed profiles, or by increasing the thickness of the solid layer of the finished extruded element. Unfortunately, extruding of profiles to a shape has an inconvenience that consists in a possibility of wrong, non-uniform head of the longitudinal narrow thin walls. And, on the other hand, increasing the thickness of the solid layer has an inconvenience which consists in a dramatic increase of specific gravity of the finished construction element. The realisations described above are basically used by all manufacturers of composite plastic-organic construction elements, and examples of products, also with overall dimensions and mass per running meter listed, are shown on the following websites: www.pro-concept.co; www.idealtaras.pl; www.e-coteac.pl.

Irrespective of the aforementioned inconveniencies, the system connecting the hard top layer with the elastic bottom layer remains a flaw. This inconvenience was eliminated thank to a structure disclosed in application No. PL401233, where the construction element in the form of a composite formed board is made of rubber aggregate combined with polyurethane resin to the form of a homogeneous rubber-polyurethane composite formed into a specified shape with a specified height. The rubber-polyurethane blend is bonded with a composite made of plastic and organic material with a fibrous structure. The bond is a permanent bond in the area of the joint, and in the other contacting area, it is preferably impermanent. The joint has a V-shape or a Y-shape or an inverted Δ-shape, constituting a material protrusion of the organic-plastic composite into the volume of the rubber-polyurethane composite, where the letter-shape base is located in the plane of contact of both composites in the contact area outside the joint.

The organic material with a fibrous structure is preferably a wood-based material and simultaneously or interchangeably a wood fibre material, and simultaneously or interchangeably a bamboo fibre material, and simultaneously or interchangeably a straw fibre material. Preferably, the rubber-polyurethane composite constitutes the bottom layer of the composite formed board. Any of the layers may have profiles at the side free after bonding, which may be aligned lengthwise and simultaneously or interchangeably crosswise, and simultaneously or interchangeably slantwise in relation to the composite formed board. The joint may be a longitudinal joint or a point joint, and the number of the joints may be multiplied.

Although so far, the solution discussed above is the best construction element in the form of a composite board, combining a hard top element with an elastic bottom/base element in its structure, however it still suffers the major inconvenience and potential safety hazard of heavy weight of the element. This is a significant disadvantage, as the mentioned construction elements in the form of a composite formed board may be manufactured in the size of a single board with length up to even 10 m without any parameter loss.

SUMMARY OF THE INVENTION

The composite formed board according to the embodiments of the present invention is made of rubber aggregate combined with polyurethane resin to the form of a homogeneous rubber-polyurethane composite formed into a specified shape with a specified height. The rubber-polyurethane blend is bonded with a composite made of plastic and organic material with a fibrous structure. The bond is a permanent bond in the area of the joint, and in the other contacting area, it is preferably impermanent. The joint has a V-shape or a Y-shape or an inverted Δ-shape, constituting a material protrusion of the organic-plastic composite into the volume of the rubber-polyurethane composite. The letter-shape base is located in the plane of contact of both composites in the contact area outside the joint.

The organic material with a fibrous structure is preferably a wood-based material and simultaneously or interchangeably a wood fibre material, and simultaneously or interchangeably a bamboo fibre material, and simultaneously or interchangeably a straw fibre material. Preferably, the rubber-polyurethane composite constitutes the bottom layer of the composite formed board. Any of the layers may have profiles at the side free after bonding, which may be aligned lengthwise and simultaneously or interchangeably crosswise, and simultaneously or interchangeably slantwise in relation to the composite formed board. The joint may be a longitudinal joint or a point joint, and the number of the joints may be multiplied.

The invention is characterised in that the composite made of plastic and organic material with a fibrous structure is a foamed mix with a density lower by at least 10%, preferably by at least 20%, than the density of a solid organic-plastic composite made of the same components, while the layer of this foamed mix is bonded permanently and inseparably with a solid plastic layer at least from the side opposite to the homogeneous rubber-polyurethane composite, the plastic preferably constituting the top layer, while the thickness of the solid plastic layer is smaller than that of the organic-plastic layer, preferably at least five times smaller, and most preferably at least fifteen times, and it is at least fifteen times smaller than the thickness of the rubber-polyurethane layer, most preferably at least twenty-five times smaller.

The solid plastic layer is preferably made of PVC or PP, or PE, or PU, or PS, or acryl, or ABS, or ASA, or SAN. The solid plastic layer may have a grooved structure or an impressed structure, and the concavity directed into the interior of the solid plastic layer. The concave structure may be planarly irregular and simultaneously or interchangeably spatially irregular, most preferably in the form of veins in wood. Thickness of the solid plastic layer may range from 0.1 mm to 3 mm, preferably from 0.2 mm to 2 mm. Thickness of the organic-plastic layer may range from 1.5 mm to 15 mm, preferably from 3 mm to 10 mm. Thickness of the rubber-polyurethane layer may range from 3 mm to 40 mm, preferably from 5 mm to 30 mm. The solid plastic layer is preferably bonded with the organic-plastic layer by a co-extrusion joint.

BRIEF DESCRIPTION OF THE DRAWINGS

The present disclosure is described in conjunction with the following appended FIGURE:

FIG. 1 illustrates a schematic cross-sectional view of an embodiment of a composite formed board.

DETAILED DESCRIPTION OF THE INVENTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment(s) of the disclosure. It should be understood that various changes may be made in the function and arrangement of elements without departing from the spirit and scope of the invention as set forth in the appended claims.

This disclosure relates in general to composite formed boards used as construction elements. More specifically, it relates to a new composite made of rubber aggregate combined with polyurethane resin to form a homogeneous rubber-polyurethane composite which is made into a specific shape and height.

The proposed solution, according to the embodiments of the present invention, aims to maintain preferable parameters of the composite formed board, such as hardness of its top layer and elasticity of its bottom layer, while keeping the dissimilarity of their character, but at the same time reducing specific gravity of the composite formed board.

In another aspect, the proposed solution aims to maintain fairly good, and unexpectedly even more favourable parameters from the utility point of view, without detriment to organoleptic perception of the composite formed board by a user, as well as without increase in its thickness, but preserving all advantages of the known structure.

In yet another aspect, the proposed solution aims in deliberate defining of density of the composite formed board, which reduces considerably the mechanical loads of the structures, for which the board is intended as a cladding, as well as it affects the possibility of transporting an increased number of the boards by transporters, which is convenient for a worker, who unloads and lays the pavement manually.

With reference to FIG. 1, an exemplary embodiment of a composite formed board is shown in a cross-sectional view. As shown in this FIGURE, the exemplary composite formed board 1 is made of rubber aggregate combined with polyurethane resin to form a homogeneous rubber-polyurethane composite 2 formed in the shape of a flat rectangular prism.

The Rubber-polyurethane blend 2 is combined with a composite made of plastic and organic material with a fibrous structure, being bamboo fibre. The bond is a permanent bond in the area of the joint 4, and in the other contacting area 5, it is impermanent. The joint 4 has a Y-shape, constituting a material protrusion 6 of the organic-plastic composite 3,3' into the volume of the rubber-polyurethane composite 2. The base 7 of the letter shape is located in the plane of contact of both composites in the contact area 5 outside the joint 4. The rubber-polyurethane composite 2 constitutes the bottom layer of the composite formed board 1. The layer 10, from its side free after bonding 8, has profiles 9, which run lengthwise in relation to the composite formed board 1. The joint 4 is a point joint, and the number of the joints 4 amounts to ten per each section of one meter of the formed board.

The organic-plastic composite 3, made of plastic and organic material with a fibrous structure, is a foamed mix 3', with a density lower by 25% than the density of a solid organic-plastic composite 3 made of the same components, while the layer of this foamed mix 3' from its side opposite to the homogeneous rubber-polyurethane composite 2, is bonded permanently and inseparably with a solid plastic layer 10, the plastic constituting the top layer 10', while the thickness of the solid plastic layer 10 is five times smaller than that of the organic-plastic layer 3', and it is smaller fifteen times than the thickness of the rubber-polyurethane layer 2. The solid plastic layer 10 is made of acryl. The solid plastic layer 10 has an impressed structure, most preferably created with a roller with a pattern, and the concavity 11 is directed into the interior of the solid plastic layer 10. The concave structure is spatially irregular, in the form of veins in wood. The thickness of the solid plastic layer 10 amounts to 1 mm. On the other hand, the thickness of the organic-plastic layer 3' amounts to 5 mm. And, the thickness of the rubber-polyurethane layer 2 amounts to 15 mm. The solid plastic layer 10 is bonded with the organic-plastic layer 3' by a co-extrusion joint 12.

An exemplary composite formed board 1 is manufactured in the following way. Rubber aggregate is combined with polyurethane resin by mixing in a mixer up to a homogeneous state of the rubber-polyurethane blend 2. Element with the shape of a flat rectangular prism are formed of the rubber-polyurethane blend 2 by extrusion in a hydraulic press using a mould at a temperature of 110° C. and under a pressure of 35 MPa. The press moulding time amounts to 20 min. Independently, in a parallel process or a process which has been carried out earlier, a foamed mix 3' is manufactured as a composite, the mix being permanently and inseparably bonded in a co-extrusion process with the solid plastic 10. The two so-bonded composites 3', 10 are combined in a hydraulic press with the rubber-polyurethane blend 2.

The foamed composite layer 3' is made of plastic and organic material with a fibrous structure, being straw fibre and simultaneously bamboo fibre. The main bonding process bonds the foamed composite layer 3', bonded previously with the solid plastic layer 10, with the rubber-polyurethane layer 2, permanently in the area of the joint 4, and in the other contacting area 5 impermanently. After filling, the mould is subjected to vibration before pressing. The combined composites 2, 3', 10 are cut to the dimension of finished products in the form of flooring strips. The mixing is carried out continuously. The bonding is carried out using four presses and eight moulds. The bonding process of the rubber-polyurethane composite 2 and the process of its combining with the foamed organic-plastic composite 3', bonded earlier with the solid plastic 10, occur simultaneously.

While the principles of the disclosure have been described above in connection with specific apparatuses, it is to be clearly understood that this description is made only by way of example and not as limitation on the scope of the invention.

The invention claimed is:

1. A composite formed board, made of rubber aggregate combined with polyurethane resin in a form of homogeneous rubber-polyurethane composite made into a specified shape with a specified height, said rubber-polyurethane blend is bonded with a composite made of plastic and organic material with a fibrous structure to form a joint, said joint is a permanent bond in an area of the joint and an impermanent bond in a contact area outside the joint, wherein the joint has a V-shape or a Y-shape or an inverted Δ-shape, constituting a material protrusion of the organic-plastic composite into a volume of the rubber-polyurethane composite, wherein a base of the joint is located in the plane of contact of both composites in the contact area outside the joint, and wherein said organic material with a fibrous structure is selected from the group consisting of wood-base material, wood fibre material, bamboo fibre material and straw fibre material, the rubber-polyurethane composite constitutes a bottom layer of said composite formed board, wherein the composite made of plastic and organic material with a fibrous structure is a foamed mix, with a density lower by at least 10% than the density of a solid organic-plastic composite made of the same components, said foamed mix layer is bonded permanently and inseparably with a solid plastic layer on the side opposite to the homogeneous rubber-polyurethane composite, the solid plastic layer constituting a top layer of said composite formed board, wherein a thickness of the solid plastic layer is smaller than that of the organic-plastic layer and the rubber-polyurethane layer.

2. The composite formed board according to claim 1, wherein the solid plastic layer has a grooved structure or an impressed structure, and its concavity is directed into the interior of the solid plastic layer.

3. The composite formed board according to claim 2, wherein the concave structure is selected from the group consisting of planarly irregular structure and spatially irregular structure.

4. The composite formed board according to claim 1, wherein the thickness of the solid plastic layer ranges from 0.02 mm to 3 mm.

5. The composite formed board according to claim 1, wherein the thickness of the organic-plastic layer ranges from 1.5 mm to 15 mm.

6. The composite formed board according to claim 1, wherein the thickness of the rubber-polyurethane layer ranges from 3 mm to 40 mm.

7. The composite formed board according to claim 1, wherein the solid plastic layer is bonded with the organic-plastic layer by a co-extrusion joint.

8. The composite formed board according to claim 1, wherein the solid plastic layer is a material selected from the group consisting of PVC, PP, PE, PU, PS, acryl, ABS, ASA, and SAN.

9. The composite formed board according to claim 4, wherein the thickness of the solid plastic layer ranges from 0.2 mm to 2 mm.

10. The composite formed board according to claim 5, wherein the thickness of the organic-plastic layer ranges from 3 mm to 10 mm.

11. The composite formed board according to claim 6, wherein the thickness of the rubber-polyurethane layer ranges from 5 mm to 30 mm.

12. The composite formed board according to claim 1, wherein each of the top and bottom layers comprises a profile on an opposite side of their bonding plane running lengthwise, crosswise, slantwise, or any combination thereof in relation to the composite formed board.

13. The composite formed board according to claim 1, wherein the joint is a longitudinal joint or a point joint, and a number of joints is multiplied for each section of one meter of the composite formed board.

14. The composite formed board according to claim 1, wherein the density of the foamed mix is at least 20% lower than that of the solid organic-plastic composite made of the same components.

15. The composite formed board according to claim 1, wherein the thickness of the solid plastic layer is at least five times smaller than that of the organic-plastic layer.

16. The composite formed board according to claim 15, wherein the thickness of the solid plastic layer is at least fifteen times smaller than that of the organic-plastic layer.

17. The composite formed board according to claim 1, wherein the thickness of the solid plastic layer is at least fifteen times smaller than that of the rubber-polyurethane layer.

18. The composite formed board according to claim 17, wherein the thickness of the solid plastic layer is at least twenty-five times smaller than that of the rubber-polyurethane layer.

19. The composite formed board according to claim 3, wherein the irregularity of the concave structure is in a form of veins in wood.

\* \* \* \* \*